United States Patent
Russo et al.

[11] 3,793,595
[45] Feb. 19, 1974

[54] SINGLE FREQUENCY STABILIZED LASER

[75] Inventors: John J. Russo, Norwalk; William Reid Smith-Vaniz, Darien, both of Conn.

[73] Assignee: The Perkin-Elmer Corporation, Norwalk, Conn.

[22] Filed: Dec. 27, 1971

[21] Appl. No.: 212,509

[52] U.S. Cl. ................................................ 331/94.5
[51] Int. Cl. ............................ H01s 3/10, H01s 3/05
[58] Field of Search .................................... 331/94.5

[56] References Cited
UNITED STATES PATENTS
3,466,565  9/1969  Rigrod ............................... 331/94.5
3,252,110  5/1966  Gustafson et al. .................. 331/94.5

OTHER PUBLICATIONS
White, A. D. Rev. of Scientific Instruments, Vol. 38, No. 8, August 1967, pp. 1079–1084.
Tomlinson et al., Applied Optics, Vol. 8, No. 1, pp. 121–129, Jan. 1969.

*Primary Examiner*—John K. Corbin
*Assistant Examiner*—R. J. Webster
*Attorney, Agent, or Firm*—S. A. Giarratana; F. L. Masselle; D. R. Levinson

[57] ABSTRACT

To increase the operating range of existing stabilized single frequency laser systems, such as the type in which the dumping mirror is supported by a piezoelectric "pusher" and a servo system monitoring the intensity of the external beam electrically controls its dimension to cause the cavity length to be locked to the center of the Lamb dip, the servo system is also made to control heating current supplied to a, say, aluminum "expander" support for the other mirror defining the laser cavity length. Prior to igniting the laser a maximum heating current is applied (for say one minute) to cause the "expander" to move the mirror toward the dumping mirror; the laser is then ignited, the heater current lowered, and the servo controls the heated expander and the piezo-electric pusher, acting respectively as a relatively slow coarse adjuster and a rapidly acting fine adjuster of the cavity length. By preheating and maintaining some heating current to the expander thereafter, cavity length stabilization is insured both during the rapid housing expansion soon after laser ignition, and for both later housing expansion and contraction caused, for example, by changing ambient temperature.

6 Claims, 1 Drawing Figure

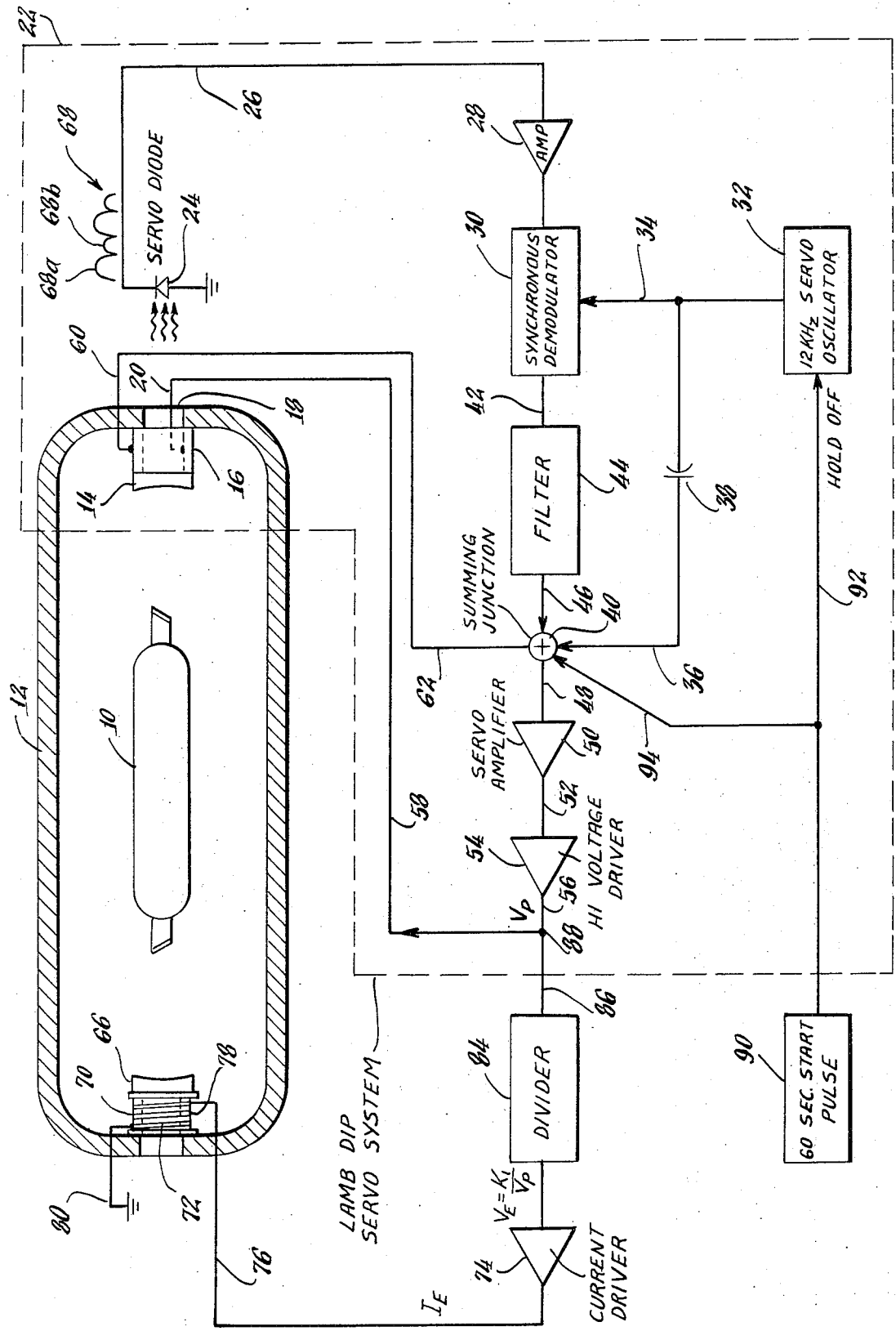

SINGLE FREQUENCY STABILIZED LASER

GENERAL DESCRIPTION

This invention relates to a laser which has been stabilized to a single frequency. More particularly the invention concerns increasing the useful range of stabilization or compensation of the resonant cavity length defined by the two laser mirrors beyond that previously obtained. Stabilization of a laser to a single frequency is important in such applications as metrology (e.g., laser interferometers).

An existing technique for precisely adjusting the cavity length of the laser so as to insure such precise single-frequency operation involves mounting the dumping mirror on a piezo-electric material which in turn is connected to the housing, so that a varying electrical voltage supplied to the piezo-electric material may rapidly and precisely move the dumping mirror to maintain a constant cavity length. The required voltage signal may be obtained from a servo system monitoring in effect the output frequency of the laser. One existing technique utilizes the Lamb-dip phenomenon, in which the servo system locks on a central radiation frequency within the Doppler broadened laser "line" which is at a lower intensity than frequencies immediately on both sides. Although such a technique can maintain a highly stable cavity length (and therefore a substantially single radiation frequency) if the extraneous factors tending to cause change in the cavity length are of relatively low amplitude, the total dynamic range of adjustment by such a piezo-electric material is quite limited. Thus, such a Lamb-dip locking servo system utilizing a piezo-electric material is in general incapable of stabilizing the laser during the relatively large thermal expansion changes in the housing (and therefore the cavity length) caused by warm-up to complete equilibrium (which may require an hour or more of laser operation) as well as similar housing length changes which may be caused by large changes in ambient temperature.

The present invention provides what may be considered an additional, relatively coarse adjuster, for example, for the other mirror defining the resonant cavity length of the laser. This coarse adjuster, hereinafter sometimes referred to as an "expander," may comprise mounting the other mirror on a material (e.g., aluminum) having a higher coefficient of expansion than the housing (e.g., Invar) and providing a heating coil for this material. During normal operation the heating current to this coil is controlled by the same servo system that controls the piezo-electric pusher supporting the dumping mirror, the slower acting but potentially greater amplitude adjustments of the other mirror caused by changing the heating current thus greatly expand the total range of stabilization of the resonant cavity length (and therefore the single frequency mode), the expander in effect acting as a slow coarse adjustment and the piezo-electric pusher acting as a fast acting vernier adjustment. By applying the heating current at substantially its maximum value (for, say, one minute) before the laser is ignited, the preshortening of the laser cavity can compensate for the relatively rapid and large lengthening tendency which would otherwise occur as the housing is rapidly heated from the (relatively low) ambient temperature toward the operating temperature of the laser. Thus as the laser is ignited, the heating current is dropped from its maximum value to a moderate value (thereafter under control of the servo system) such that this relatively low heating combined with the previous preheating at least approximately compensates for the rapid housing temperature change during the first few minutes of operation. The various parameters (including the amount of initial preshortening of the cavity length and the relative length and thermal expansion coefficients of the housing and the expander) are so chosen that some heating current is supplied to the expander under all operating conditions, thereby insuring that the end mirror may always be moved in either direction by decrease as well as increase of the heating current, so as to insure satisfactory operation of the expander to compensate for factors tending to decrease (e.g., falling ambient temperature tending to reduce the housing temperature during operation) as well as to increase the resonant cavity length. The heating current to the expander may be controlled, with the addition of only relatively few elements, by the existing servo system in a Lamb-dip servo stabilized laser system, so as to greatly increase the total range of control of the original servo system by a large factor, while only requiring a relatively low increase in complexity and cost. The invention has been successfully added to an existing piezo-electric type Lamb-dip stabilized laser system, which previously required one and one-half hours of operation before the laser housing was sufficiently thermally stable to insure single frequency operation; with the invention incorporated therein, only a one-minute preheating was required to insure that the larger range of stabilization capacity of the whole system could maintain a single-frequency mode from immediately after ignition for an indefinite period and for ambient temperature changes within the range of 32° to 100° F.

An object of the invention is to provide an improved single-frequency stabilized laser system, having a large dynamic range of stabilization capacity while retaining a rapid and precise compensation of the resonant cavity length and therefore the frequency of the laser.

Another object of the invention is to provide a relatively coarse but large range stabilization of the resonant cavity length, which in conjunction with an existing rapidly acting, precise but small dynamic-range stabilizing assembly provides a large range, rapid, precise compensation of the resonant cavity length.

A further object of the invention is the provision of a single frequency stabilized laser system which has sufficient compensation range capability to insure that the laser is stabilized to a single frequency substantially upon start-up, after only a very short (e.g., a minute) pre-warm-up time.

A more specific object of the invention is the addition to a laser system having a precise but narrow dynamic range laser resonant cavity length compensator of a large-range coarse stabilizer which is capable of both approximately stabilizing the cavity length after only a short pre-warm-up period and additionally operating in conjunction with the existing fine stabilization system to insure complete compensation over a large range of operating conditions.

Further objects, advantages and features of the invention will be obvious to one skilled in the art upon reading the following detailed description in conjunction with the accompanying drawings, in which:

The sole FIGURE is a partly diagrammatic, partly schematic representation of an improved laser stabilizing system of enhanced dynamic range according to the invention.

DETAILED DESCRIPTION

The conventional parts of the laser and a known type of single frequency stabilizing assembly (a Lamb-dip servo system in the exemplary embodiment) will first be described with reference to the single FIGURE of the drawing. For purposes of concreteness it will be assumed that the laser itself is of the well-known helium-neon type. Accordingly the lasing gaseous mixture will be contained within a laser tube or envelope 10 having conventional Brewster angle windows at each end. The two mirrors defining the resonant cavity of the laser are ultimately supported by a housing diagrammatically illustrated at 12. One of the mirrors 14, assumed to be the partially transmitting or dumping mirror, is supported on one end of a variable length "pusher" 16, the other end of which is mounted in any convenient manner to one end of the housing 12 as indicated at 18. The variable length pusher 16 of the exemplary embodiment comprises a piezo-electric material (e.g., crystal) which exhibits the characteristic of being constricted and therefore shortened as an increasing voltage is coupled thereto, as by high voltage input lead 20. Although such a piezo-electric pusher 16 is capable of both rapid and precise variation of its length with applied voltage over a relatively small range (e.g., 50 microinch) when the pusher is of reasonable length, its total adjustment range is limited to such a relatively small range unless the overall length of the piezo-electric material becomes extremely large (which in general is impractical). Thus a piezo-electric pusher, to which a variable high voltage correction signal is supplied at 20, is capable of moving mirror 14 both rapidly and precisely through a limited range to compensate for relatively small magnitude factors tending to cause undesired variation in the resonant cavity length, but in general is not capable of providing the relatively large movement of mirror 14 to compensate for larger magnitude factors tending to change the cavity length. Such large magnitude changes typically occur during the period when the laser is turned on until the heat emitted by the laser causes the housing 12 to reach a temperature equilibrium (i.e., the thermal expansion of housing 12 stops changing); such temperature equilibrium typically is not reached until the laser has been operating for one or two hours, so that the piezo-electric pusher has insufficient dynamic range of adjustment to truly stabilize the laser cavity length until the laser has been operating for this length of time. Further, even after the laser housing has reached such equilibrium following long operation of the laser, a large change in the ambient temperature can shift this equilibrium sufficiently to again be outside of the range of the length excursions of the piezo-electric pusher 16. Assuming that the laser has been allowed to operate for such a relatively long time and that the ambient temperature range is moderate, such a piezo-electric pusher is capable of precisely maintaining the constant resonant cavity length, one successful type of control of pusher 16 involving the servo system utilizing the well known Lamb-dip phenomenon to generate the correction voltage signal applied at 20 to pusher 16.

The well known Lamb-dip in the oscillation frequency of a single order of the laser radiation, shown for example in FIG. 2 on page 1438 of the W. E. Lamb, Jr. article entitled "Theory of an Optical Maser" in *Physical Review*, Vol. 134 No. 6A (June 15, 1964) pp. 1,429–1,450, has already been used to generate the correction voltage signal to tune the resonant cavity length to the center of this Lamb-dip. A servo system of this generally known type is schematically illustrated within the dashed block 22, merely as an exemplary existing single-frequency stabilization system with which the improvement according to the invention (described later) may be used. Such a known type of Lamb-dip servo system may include a radiation sensitive diode (or other detector) 24 which monitors the intensity of the laser radiation and supplies a signal over lead 26 to an amplifier 28 feeding a synchronous demodulator 30. An oscillator 32 (for example, at 12 kilohertz) both supplies at 34 the synchronizing or gating signal to the demodulator, and (after d.c. decoupling at 38) also one input at 36 to a summing circuit 40. The d.c. output at 42 of the synchronous demodulator 30 (after suitable filtering to remove any residual a.c. component at 44) is fed as another input 46 to the summing circuit 40. The output of the summing circuit at 48 is fed to a servo amplifier 50, the output of which at 52 forms the input to a high voltage driver 54, the voltage output ($V_P$) at 56 being fed over lead 58 to the input 20 of the piezo-electric material pusher 16. A return lead 60 from the pusher 16 closes the loop being connected at 62 to the summing circuit 40.

Operation of this generally known type of Lamb-dip servo system for locking the laser radiation frequency to a single value (at the center of the Lamb-dip) is as follows. It will be assumed that the distance between the dumping mirror 14 and the end mirror 66 defining the resonant cavity length remains within the capability range of the piezo-electric pusher 16 (e.g., about two wavelengths for a helium-neon gas laser at 6328A, or about 50 microinches); this assumption will be true for a laser system (not incorporating the invention) in general only when the laser has been running for quite some time (e.g., more than an hour) so that all the parts are substantially in thermal equilibrium and the ambient temperature surrounding the housing 12 does not vary by very large amounts (which usually will be true in any indoor environment). Thus the purpose of such existing Lamb-dip servo systems having a relatively narrow dynamic range is to maintain the resonant cavity length between the mirrors precisely constant where this distance is already assumed to vary by only a small amount (e.g., ± 25 microinches). The, say, 12 kilohertz oscillator 32 supplies through lead 36 and summing circuit 40 a relatively small a.c. signal which after amplification causes the high voltage driver 54 to supply a moderate voltage signal over leads 56 and 58 to the input 20 of the piezo-electric pusher; this causes the piezo-electric pusher to vibrate or "dither" by a small amount (about 0.1 microinch) at this same 12 kilohertz frequency. Assuming that the system has already "acquired" the Lamb-dip, this dithering of the piezo-electric pusher and therefore of mirror 14 will cause the resulting resonant cavity length changes to pass through the exactly "correct" resonant cavity length, that is, the one corresponding to the exact frequency at the center of Lamb-dip. Since the center of the Lamb-dip is by definition lower in intensity than frequencies immediately on either side thereof, this will cause the intensity of the radiation from the laser passing through the somewhat transparent dumping mirror 14 to be intensity modulated symmetrically. Specifically, the symmetrical signal will be of the form of a full-wave rectified a.c. signal of 12 kilohertz (i.e., having a positive, and in this case equal, half-cycle at a repetition rate of 24 kilohertz). When the dithering occurs through the Lamb-dip but not exactly centered thereon, the alternate half-cycles will not be equal. Therefore the radiation sensitive diode 24 will then generate an electrical signal having an a.c. component at this dithering frequency of the type generally shown on lead 26 at 68, where 68a and 68b are the alternate un-equal half-cycles. The lack of equality of course varies with the displacement of the center of the dithering of the mirror 14 from the "correct" (Lamb-dip centered) position. The a.c. signal at 68 after suitable amplification at 28 is fed to the synchronous demodulator 30 which receives as its synchronizing or gating signal at 34 the same frequency signal from oscillator 32.

The output at 42 of the synchronous demodulator will therefore be a d.c. signal having a level proprotional to the absolute difference between the alternate half-cycles (e.g., 68a and 68b) of the original a.c. signal 68, and will have a sign determined by which of the alternate half-cycles is the greater. This d.c. correction signal after suitable filtering to remove any a.c. component at 44 will also be fed to the summing circuit at 46. This d.c. correction signal, after amplification at 50, will be applied to the input 52 of the high voltage driver 54 so as to cause a change (in the average level of) the voltage at its output 56. The direction of the change will of course be such as to make the changed d.c. component (i.e., the average level) of the voltage applied through lead 58 to the input 20 of the piezo-electric pusher to cause the average position of the dithered mirror 14 to be moved in the direction of the "correct" resonant cavity length (that is, tending to cause the laser to produce the single frequency corresponding to the center of the Lamb-dip). To maintain a stable "closed loop" system, the d.c. voltage applied to the pusher is fed back at 60, 62 to the summing circuit 40, so that the d.c. component of the output 56 of the high voltage driver will be the originally existing d.c. level plus (or minus, as the case may be) the correction signal 46.

Obviously, as in any closed loop servo system, when the d.c. component fed at 56, 58, 20 to the pusher is exactly at the right level to cause the mirror 14 to dither about the "correct" position, the d.c. error signal at 46 will be zero and the closed loop through 56, 58, 20, 60, 61, 62, 40 and 48-54 will maintain the voltage supplied to the pusher at this correct level. The d.c. correction signal at 46 will of course go to zero when mirror 14 is symmetrically dithering about the correct position, since the symmetry of the a.c. modulation of the laser intensity caused by such symmetrical dithering will result in the radiation sensitive diode 24 producing a symmetrical a.c. signal, that is, where each half-cycle 68a and 68b are identical. Such a perfectly symmetrical signal will of course produce a zero d.c. level at 42, after being synchronously demodulated at 30. It may be noted that an error signal at 46 causing the voltage at 56 to increase will cause the piezo-electric material of pusher 16 to contract, thereby moving the average position of mirror 14 to the right so as to lengthen the average length of the cavity; while lowering of the average (d.c.) voltage applied to the piezo-electric pusher will reduce its constriction so as to lengthen the pusher to move mirror 14 toward the left, thereby shortening the resonant cavity length defined between mirrors 14 and 66.

Although such a Lamb-dip servo system can readily be made in which the total range of the piezo-electric pusher may cause movement of the mirror 14 of, say, 50 microinches (corresponding to two "line" wavelengths or two "orders" of a helium-neon laser, thereby having more than sufficient range to lock onto a Lamb-dip in a single order), this total dynamic range is quite small when compared to the maximum thermal expansion range of the housing 12, especially when the housing undergoes heating from its cold or ambient (e.g., room) temperature to its operating temperature. Indeed for such a 50 microinch dynamic range of the piezo-electric pusher 16, the housing length would have to be somewhat more stable (e.g., 25 microinches); even when the housing 12 is made of an extremely low expansion material (e.g., Invar) and certain techniques are utilized to further compensate the effect of thermal expansion changes in the housing as they affect one or both of the mirrors 14, 66, such stability in the effective housing length is normally attained only after thermal equilibrium is closely approached as when the laser has been operating for a substantial length of time (e.g., an hour or more).

The present invention provides what may be considered a "coarse" (as compared to the fine adjustment of the piezo-electric pusher 16) of the resonant cavity length to compensate for such thermal expansion (and other) effects which would otherwise cause changes in the distance between mirrors 66 and 14 that are greater than the dynamic range of the piezo-electric pusher. As will be seen immediately hereinafter, the present invention utilizes in part the existing Lamb-dip servo system so that the additional coarse adjustment is also of the closed loop type, thereby assuring stability of the actual resonant cavity length between the mirrors substantially from the moment of ignition of the laser, thereby avoiding the need for a long warm-up period, as well as being capable of compensating for thermal expansion (caused by large changes in ambient temperature during laser operation, for example) or other factors tending to change the resonant cavity length. Although the following description of an exemplary embodiment of the invention assumes that it is utilized in conjunction with a Lamb-dip type of servo system, it may obviously be utilized with any type of system (whether presently known or not) capable of providing precise adjustment of the resonant cavity length over a limited range; thus, although the previous and following description assumes that the invention is being used in conjunction with such a particular fine-adjustment servo system, it will be obvious that the invention may be utilized with other such systems as long as they furnish some signal representative of the type of resonant cavity length change desired.

The first element forming part of the second or coarse resonant cavity length compensating assembly of the invention is the utilization of a mounting block or spacer 70 secured at one end to the housing 12 and supporting at its other end the mirror 66. The spacing block 70 is of a material (e.g., aluminum) which has a substantially larger coefficient of thermal expansion than the housing 12. In particular the ratio of the thermal expansion coefficient of the material of block 70 to that of housing 12 (e.g., Invar) is approximately equal to the ratio of the effective length (i.e., the horizontal direction in the drawing) of the housing (e.g., about 140 cm.) to that of the spacer block 6.4 mm.). Ideally if the total thermal expansion (that is, the length of times the coefficient of expansion) of the spacer block 70 were exactly equal to the thermal expansion of the housing, the lengthening of the housing at increasing temperatures (tending to move mirror 66 to the left relative to mirror 14) could be exactly compensated by the total thermal expansion of spacer block 70 (tending to move mirror 66 to the right or toward mirror 14). As a practical matter, however, it is essentially impossible to achieve such thermal matching (within the accuracy required) not only because of the extreme precision of such matching required, but also because of the existence of temperature gradients (i.e., not all parts of the housing are in general at exactly the same temperature, let alone at exactly the same temperature as the block 70), as well as the fact that the thermal expansion of the block and especially the housing would not be perfectly linear (i.e., the actual expansions of the two elements would not exactly track over any appreciable temperature range). However, the thermal expansion of spacer 70 will compensate roughly for the thermal expansion of the housing over any reasonable temperature range (even in the presence of moderate temperature gradients) to, say, about one hundred microinches (that is, on the order of 1/10,000 of an inch) over the range of temperatures actually encountered. The remaining (servo loop controlled) parts of the second or coarse cavity length compensation assembly (further compensating the position of mirror 66) operate to supply a controlled amount of heat to spacer block 70 (by supplying current to heater coil 72).

The preferred specific exemplary embodiment of this variable heating assembly is so operated as to be capable of, in effect, lengthening (by supplying more heating current) or shortening (by reducing the heater current) the length of spacer block 70. It may be noted, however, that even a controlled assembly that was capable of changing the length of spacer blocks in only one direction (say, lengthening it) can be theoretically utilized if the thermal expansion (i.e., the length times the coefficient of thermal expansion) of block 70 (absent any heat) is intentionally chosen relative to the thermal expansion of housing 12 to be mismatched in the opposite sense (in this case, to expand less from a cold start to operating temperature, i.e., to undercompensate the housing thermal expansion). In other words, in such an alternative embodiment mirror 66 would move to the left (farther from mirror 14) as the laser (and therefore the housing 12 and block 70) warmed up, so that an increasing amount of heating current would have to be supplied to coil 72 to continually lengthen block 70 in order to move mirror 66 back to the desired stationary position. The acutal exemplary embodiment, although utilizing only heating (and not cooling) as the servo controlled instrumentality for changing the length of block 70, is so operated that heat is always supplied to the block, allowing reduction in the heating current, thereby effectively shortening block 70 (as well as obviously allowing increasing of heating current to lengthen it). These parts about to be described will variously be referred to as the (control and)controlled parts of the coarse (or rough) resonant cavity length adjusting assembly or system, the intermediate resonant cavity length adjusting parts or assembly, or the variable parts or assembly of the coarse adjusting system.

Besides heating coil 72 the intermediate or controlled parts of the coarse adjusting system include a variable current driver 72 connected to lead 76 to one end 78 of coil 72, the other end of which is schematically illustrated as being returned to ground at 80. The input 82 to the variable current driver 74 is controlled by a divider circuit 84, the input of which at 86 is connected to the output 56 of the high voltage driver (of the previously described servo-system) as at 88. The divider circuit 84, besides introducing a scaling factor, say, $K_1$, effectively forms a reciprocal of the high voltage output $V_P$ of voltage driver 54 appearing at its input 86, so that the output 82 of dividing circuit 84 will be of the form $V_E = K_1/V_P$. The reason for this inverse control connection is that a high voltage at $V_P$ causes shortening of the piezo-electric pusher 16 and therefore movement of mirror 14 so as to effectively lengthen the resonant cavity; while high current, $I_E$ on lead 76 will cause lengthening of the spacer block 70 (hereinafter also referred to as the "expander") which would move mirror 66 toward mirror 14, thereby shortening the resonant cavity length. It is therefore necessary to make the current $I_E$ (and therefore the control voltage $V_E$ of the current driver 74) an inverse function of the d.c. or average voltage $V_P$ being supplied to the piezo-electric pusher in order to make the expander 70 work in concert (rather than in opposition) to the piezo-electric pusher 60.

Although the elements so far described are sufficient to provide a complete "coarse" resonant cavity adjustment during normal laser operation in conjunction with the previously described fine adjustment assembly (that is, the Lamb-dip servo system 32 previously described), description of this normal operation will be deferred until the start-up operation has been explained. Assuming the laser is off, the starting of the entire system is occasioned by initiating a continuous start pulse (of, say, 60 second duration) as schematically illustrated at 90 at substantially the same time that all of the various electrical elements shown are also turned on. The sixty-second start pulse temporarily disables, as schematically illustrated by lead 92, the dithering 12 kilohertz oscillator 32, effectively disabling the synchronous demodulator and therefore nulling both inputs 36 and 46 to the summing circuit 40. At the same time a starting pulse in the form of a relatively low amplitude square wave signal is supplied by lead 94 as a temporary input to this circuit 40 so as to cause the output 48 thereof to be at a relatively low level (of the correct polarity) to cause the output 52 of the servo amplifier 50 to cause the high voltage driver 54 to produce a relatively low d.c. voltage ($V_P$) at 56, thereby causing only a slight shortening of the piezo-electric pusher 16 from its zero voltage value, so as to move mirror 14 only slightly from its most left-hand position (corresponding to maximum shortening of the cavity position of this mirror). The relatively low value of voltage $V_P$ on lead 56 and therefore lead 86, however, causes the output voltage $V_E$ on lead 82 to be very close to its maximum, so that the output current $I_E$ to the heating coil of the expander is substantially at such maximum value. This causes relatively rapid expansion of the expander block to almost its maximum length, so that mirror 66 is moved toward mirror 14 to at least near its closest position. Even though the laser has been operating during this time, at the end of this sixty second pre-warm-up period, both of the mirrors 14 and 66 will be positioned almost as close to each other as the pusher 16 and especially the expander 70 are capable. After the end of this pre-warm-up period, aquisition circuitry is activated, and the end of the 60 second start pulse will both lower the current to the heating coil of the expander and cause the oscillator 32 to begin to operate so as to enable the entire Lamb-dip servo system 22. Acquisition of the center frequency of the Lamb-dip of the nearest "order" of the laser (partly by means not fully illustrated in the drawing) will necessarily cause mirror 14 to move toward the right from its substantially extreme left (shortest cavity length) position it occupied during the pre-warm-up period. Thus the Lamb-dip servo system will be supplying an increasing voltage $V_P$ to the electric pusher 16 to shorten it so as to move mirror 14 to the right. This relatively high level pusher voltage $V_P$ will cause the inversely related expander control voltage $V_E$ at 82 to be at a relatively low level, so that the heating current $I_E$ will diminish to a value substantially below its almost maximum value it had assumed during the pre-warm-up 60-second period. This diminishing of the current to coil 72 and therefore the heating of expander block 70 will also cause lengthening of the resonant cavity (i.e., movement of mirror 66 to the left). Thus as the center of the Lamb-dip is found and locked onto, both the current $I_E$ and the actual length of the extender block 70 will be at some intermediate value. The effect of the 60-second preheating of the block 70 is therefore to insure that when the Lamb-dip locking occurs both this heating current and the length of the block 70 will be intermediate their maximum and minimum values. This insures that the expander block 70 may be both lengthened and shortened by changes (increase and decrease, respectively) in the heating current $I_E$ during laser operation, thereby affording the ability to move mirror 66 either closer to or farther away from mirror 14. This ability therefore insures that the expander has a substantial range of adjustment in both senses, so as to be capable of compensating in either direction for factors (especially thermal expansion effects) tending to change the spacing between the mirrors in either direction.

Once this locking in such intermediate position of mirror 66 has occurred, the Lamb-dip servo system acts to control in a closed loop manner both the precise rapidly acting piezo-electric pusher 16 and the lower acting, larger range expander 70. Thus if some factor tends to move mirror 66 farther from mirror 14, an error signal will develop at 68 of such phase as to cause the synchronously demodulated signal at 42, 46 to reduce the voltage $V_P$ being supplied the piezo-electric pusher (thereby lengthening the pusher and causing mirror 14 to move toward mirror 16, tending to again shorten the resonant cavity length). At the same time this reduced voltage at $V_P$ will cause an increase in the expander control voltage $V_E$ and therefore an increase in the expander heating current $I_E$, which will lengthen expander block 70 so as to move mirror 66 toward mirror 14 (i.e., will also act to shorten the cavity length). Thus the piezo-electric pusher 16 and the expander block 70 will under control of the same closed loop system operate in concert to compensate any factors tending to change the effective resonant cavity length (the distance between the two mirrors).

Because of the naturally longer "time constant" of the response of the expander block occasioned principally by the thermal lag between application of heating current to the coil 72 and actual heating of the block 70, the "coarse" control loop (elements 70-88) will always cause much slower changes in the resonant cavity length than the substantially instantaneous acting Lamb-dip servo system involving the piezo-electric pusher 16. In other words the two control systems, although acting in concert in the same sense, will never cause a hunting or oscillation because of this large difference in response time. Thus the "coarse" assembly or system gradually corrects for large (and relatively slowly acting) factors tending to change the resonant cavity length (in particular the relatively slow thermal expansion drift caused by the housing being heated to an equilibrium temperature during the first hour or so of laser operation, or by relatively large changes in ambient temperature during operation). At the same time the fine adjustment control system 22 causes the piezo-electric pusher 16 rapidly and precisely to correct the resonant cavity length to that corresponding to the center frequency of the Lamb-dip, the "coarse" adjustment system assuring that the actual position of the mirror 66 is stabilized within, say 25 or 50 microinches, so that mirror 14 need not be moved more than this to maintain an exact constant resonant cavity length. It may be noted that the "coarse" adjusting system is actually of a closed loop nature in that the "loop is closed" by the actual position of mirror 66 (relative to mirror 14) by the highly precise technique (for producing an error signal) utilized in the Lamb-dip servo system 22 itself. In other words the effective value of the current $I_E$ is controlled in a closed loop manner by "reading" the actual position of mirror 66 in this manner, even though the value of this current is itself not fed back to any control element.

As noted above, the fact that the starting pulse supplied by 90 causes a foreshortening of the resonant cavity during laser ignition assures that once the servo system has locked onto the center frequency of a Lamb-dip, some intermediate value of the current (substantially less than the maximum) will be supplied at $I_E$, thereby assuring the ability to adjust mirror 66 in both senses, since the current $I_E$ will never be either at (or very near) its maximum nor at (or very near) zero during actual laser operation. In other words, the heating power supplied to block 70 will always be of a mid-range value when the laser is operating. Assuming that the length (relative to its coefficient of thermal expansion) of the block 70 is chosen to be slightly greater than necessary to compensate for the expansion of the housing 12 as the temperature thereof rises (but no heater power is supplied), then the amount (of additional shortening and therefore) of heating power required will tend to diminish as the housing reaches its full operating temperature, reducing any second order gradient effects between the block 70 and the housing 12 and mirror 66.

The preheating technique of the preferred illustrated embodiment pre-shortens the laser resonant cavity to a shorter length than it would otherwise ever reach, that is, at the highest operating temperature for such a naturally (i.e., without any added heating power) "overcompensating" block 70 so that heat is always required to maintain this relatively short cavity length (thereby assuring the ability to lengthen the cavity by reduced heating current at all times). The alternative of making the block 70 undercompensate (without adding heating power) so that mirror 66 was in its rightmost ("shortest cavity length" position) when the laser was cold (off) would in theory obviate the requirement of pre-heating the block (i.e., pre-shortening the cavity) before laser ignition, but would in fact also cause loss of control (as to further shorten the cavity) during the period immediately after laser ignition since the heating current would still be at (or at least near) zero for a short period after ignition (and before the housing actually expanded). Such less desirable alternative would also require the greater total heating power during the longer periods of laser operation and the attendant undesirable induced temperature gradients just noted.

It is obvious that there are innumerable combinations of housing dimensions (especially length), housing material, and expander block length and material that would yield at least very approximate thermal expansion compensation. The necessary range of the controlled "coarse" adjustment of the expander block, determined by the length and material (i.e., thermal expansion) of the block and the heating power applied thereto (which in turn is a function of the electrical resistance of the heater coil and the range of current values applied thereto) must at least slightly exceed the rough thermal expansion compensation "error" (preferably over-compensation of the housing expansion) remaining after at least almost matching the dimensions and materials of the housing on the one hand, and the expander block and piezo-electric pusher (the thermal expansion of which also acts in the same manner as the thermal expansion of the expander), on the other hand. The required "dynamic precision" of the controlled coarse adjustment assembly (i.e., the maximum error allowed thereby in the cavity length at any time, determined by the "tightness" of the closed loop, which in turn depends on maximum loop gain and response time relative to the size and speed of change of the cavity-length changing factors encountered) must of course be within the total range of the fine adjustment assembly (e.g., less than the 50 microinch range of the exemplary piezo-electric pusher "fine" adjustment, determined by the "tightness" (gain and speed of response) of the fine control servo loop and the "gain" (length and material for a given range of variable voltage) of the piezo-electric pusher (these parameters as well as the total range of the pusher forming no part of the present invention), is assumed to be capable of locking into a single frequency, e.g., the center of the Lamb-dip.

A successful specific embodiment of the invention, which required only a 1-minute pre-warm-up period, and was then capable of attaining and holding a single frequency "lock" over an ambient temperature range of 32° to 100° F has been made. The length and material of the expander was chosen such that its thermal expansion (unheated) plus the thermal expansion of the piezo-electric pusher (both expansions at higher temperature tending to move the mirrors toward each other to shorten the resonant cavity) slightly "overcompensated" the thermal expansion of the housing (which tends to move the mirrors farther apart at increasing temperature). Because of the temperature gradients during laser operation, precise thermal expansion compensation (i.e., to less than the range of constriction, say, 25 microinches, of the piezo-electric pusher) over a say, 100° F range of temperature variation is at best extremely difficult (if not actually impossible), but it is relatively easy to obtain approximate compensation to, say, about 100 microinches over such a range (i.e., averaging about 1 microinch per °F), especially if the (only a few inches long) housing is made of a low thermal expansion material (e.g., Invar). Thus, the coarse dynamic (closed loop) length adjustment supplied by the variable electrical heating of the expander need only have a somewhat greater range than this. For example, a block of 2024-T4 aluminum alloy (say, of one-quarter inch length and having a linear coefficient of thermal expansion of 12.5 microinches per °F per inch) expanding in length about 3.1 microinches per °F, afforded a more than 300 microinch adjustment range when heated by a coil (wrapped about the approximate one-half inch diameter of the cylindrical expander block) of about 100 ohms resistance and supplied by a variable current driver capable of supplying up to 250 m.a. of current. The dynamic precision of the controlled heating of this expander block was such as to ensure maintenance of the resonant cavity length within ±12 ½ microinches (well within the ±25 microinch capability of the fine adjustment provided by the piezo-electric pusher). As previously noted, the preferred over-compensation of the tendency of the housing expansion (at rising temperatures) to cause lengthening of resonant cavity may be obtained by use of an expander block slightly "too long," which, without heating and in conjunction with the similar effect of the thermal expansion of the piezo-electric pusher, causes the mirrors to move closer together at increasing temperatures. The error in matching in this case may be stated as a shortening of the resonant cavity by up to about, say, 100 microinches as the temperature rises; this causes a lowering of the heating current supplied to the expander so as to shorten it and therefore lengthen the cavity to compensate for this "overcompensation" of the thermal matching. Finally, such varied heating of the expander is sufficiently rapid to ensure that the net expansion "drift" is maintained (e.g., ±12.5 microinches) within the range of fine precise adjustment provided by the voltage controlled piezo-electric pusher (e.g., ±25 microinches). Thus, rough thermal expansion matching (preferably with some overcompensation) of the components (namely, the housing, the piezo-electric pusher and the expander) and the variable controlled heating of the expander to cause "coarse" compensation of the residual net thermal expansion changes (caused by both imperfect matching and the differential expansion effects of uneven heating of the parts, i.e., temperature gradients) allow the limited range of the rapid, fine adjustment of the piezo-electric pusher to maintain the "lock" on the Lamb-dip from substantially immediately after the one-minute pre-warm-up period (during which the expander is heated) definitely, despite the subsequent (somewhat uneven) heating of the parts caused by the laser operation (thermal equilibrium typically not being closely approched for an hour or two) even in the presence of ambient temperature changes over a large range (e.g., 32° to 100° F).

We claim:

1. In a frequency stabilized laser system of the type including a first assembly for rapidly compensating the laser resonant cavity length by small amounts to counteract factors tending to change said length and therefore the frequency of the emitted radiation of the laser, wherein said first assembly is rapidly acting and precise but has a relatively small dynamic adjustment range, the improvement comprising:

a second assembly for at least approximately compensating said resonant cavity length over a substantially larger adjustment range than the range of said first assembly, said second assembly comprising a spacer block supporting one resonant cavity-defining mirror from one end of the housing of the laser, said spacer block being of a material having a substantially different coefficient of thermal expansion than the material of said housing;

said second assembly further comprising means for supplying thermal energy to said spacer block to change its length and therefore the position of said one mirror;

and control means operatively connected to said second assembly to cause said second assembly to compensate said resonant cavity length over said relatively larger range to a length at least within said relatively small adjustment range of said first assembly, said control means comprising thermal energy adjusting means for controlling the effective thermal energy supplied to said spacer block;

so that said laser system is frequency stabilized even when the large magnitude of the length-changing factors would otherwise have caused cavity length changes outside the relatively small dynamic adjustment range of said first assembly;

said spacer block being of an effective length and of a material having a coefficient of thermal expansion of such value that the product thereof roughly compensates for the net potential change in length of the resonant cavity caused by thermal expansion of the material of the laser housing and other elements determining the effective spacing of said one mirror and the other resonant cavity defining mirror, but said length and coefficient of thermal expansion of said block being of such relative values that their product causes a slight mismatching in a known sense of the roughly compensated thermal expansion of said laser housing and other elements, whereby in the absence of any thermal energy supplied to said spacer block the effective spacing between said one mirror and said other resonant cavity defining mirror changes in a particular direction as the laser gradually warms up, so that an always positive amount of thermal energy is required to be supplied to said spacer block to compensate said thermal expansion of said laser housing and other elements to within the adjustment range of said first assembly.

2. An improved frequency stabilized laser system according to claim 1, further comprising:

a servo system, responsive to the condition of the laser, is operatively connected to said first assembly to cause it to compensate for small laser cavity length excursions;

and means for operatively connecting said control means of said second assembly to said servo system at least immediately after ignition of said laser, so that said second assembly operates in concert with said first assembly during laser operation, whereby during laser operation said second assembly provides approximate resonant cavity length compensation over a large dynamic adjustment range and said first assembly provides precise cavity length compensation, said two assemblies together thereby providing precise compensation over a large adjustment range.

3. An improved frequency stabilized laser system according to claim 2, further comprising:

starting condition setting means operatively connected to said control means of said second assembly prior to laser ignition to cause said second assembly rapidly to adjust said resonant cavity length to a starting value, said starting value being such that changes therefrom caused by heating of the various laser parts during the period after laser ignition are within the adjustment range of said second assembly when it is operatively connected to said servo system during laser operation.

4. An improved frequency stabilized laser system according to claim 1, in which:

said length and value of coefficients of thermal expansion of said block are such that as the general temperature increases from soon after laser ignition to later operating conditions, said block expands more than necessary to maintain constant resonant cavity length, whereby a lessening amount of thermal energy to said spacer block is required to maintain length compensation as the laser parts warm up toward temperature equilibrium, thereby reducing both the amount of thermal energy required and any secondary temperature gradient effects.

5. An improved frequency stabilized laser system according to claim 1, in which:

said thermal energy supplying means comprises an electrical heater member;

and said energy adjusting means comprises means for supplying a controlled amount of electrical energy to said heater member.

6. An improved frequency stabilized laser system according to claim 5 in which:

said electrical heater comprises a coil of electrically conducting wire generally surrounding at least a substantial portion of said spacer block.

* * * * *